May 25, 1965　　　J. V. RESNICK　　　3,185,588
METHOD OF COATING A BLOWING AGENT ONTO THE SURFACE
OF POLYSTYRENE PELLETS
Filed March 14, 1960

INVENTOR
JOSEPH Y. RESNICK
BY
ATTORNEY.

United States Patent Office 3,185,588
Patented May 25, 1965

3,185,588
METHOD OF COATING A BLOWING AGENT ONTO THE SURFACE OF POLYSTYRENE PELLETS
Joseph Y. Resnick, Ellenville, N.Y., assignor to International Research & Development Co., Ellenville, N.Y.
Filed Mar. 14, 1960, Ser. No. 18,463
2 Claims. (Cl. 117—100)

This invention relates to a method of producing thermoplastics having special properties.

The manufacture of plastic articles usually requires plastic materials having special properties. For example, a plastic article used in the field of electronics may require dielectric properties. Another plastic article used in a chemical industry may require properties rendering it resistant to certain chemical influences. Still another plastic article used as a toy may require a certain structural strength which would enable it to resist breakage. It may also require non-toxic coloring matter to prevent injury to infants. Other plastic articles may require various properties such as stability at elevated temperatures, elasticity at low temperatures, and resistance to damage or discoloration when exposed to the sun. Additives are generally embodied in the plastic material of which such articles are made in order to produce or achieve the desired qualities. Illustrations of other additives are pigments and dyes of every description, fire-retarding chemicals, blowing or foaming agents, surface tension agents, and decorative materials.

These various properties may be embodied in many basic types of plastic material. For example, acrylic and polystyrene plastics are commonly used in the applications above mentioned and the common procedure is to compound each batch of material in accordance with individual requirements of a given product. Suitable additives are combined with the basic monomer, the additives are uniformly dispersed throughout the monomeric material and polymerization then takes place. In other words, the basic plastic material is polymerized after it is combined with the required additives and not before. Thus, each production run requires a special mix even though the basic plastic material may be the same as in the production runs which precede and follow it.

It is evident that this procedure is time-consuming and expensive. Preparing a special mix or batch for each job is analogous to the requirement in other industries for special tooling or setting-up for individual production runs. To the extent that each job requires special handling, preparation or formulation, it becomes time-consuming and costly.

The problem of combining an additive with a monomer is aggravated by the fact that many additives are not compatible with various monomers in the sense that they interfere with polymerization. Such interference in many cases not only inhibits polymerization of the basic plastic material but it also produces undesirable or premature reactions. By way of illustration, blowing or foaming agents may cause premature foaming which would utterly destroy the usefulness of the plastic material for the purposes intended. In such cases the additive is excluded from the basic plastic material during polymerization and it is mixed into the polymerized mass immediately following polymerization. But irrespective of whether the additives are combined with the basic plastic material prior, during or following polymerization, the essential procedure remains the same, namely providing individual batches for the requirements of individual jobs.

It is the object of this invention to provide a unique method of preparing plastic materials having the required special properties above mentioned without batching the basic plastic in the manner above described. More specifically, the present method incorporates the various properties into the basic plastic material after it has been fully polymerized and during the molding or extruding operation. The basic plastic polymer is prepared in the form of pellets or "preforms" by conventional methods. These pellets are the basic raw material for all individual jobs or production runs utilizing the same polymer but requiring different additives. These polymerized pellets are then coated with a partially polymerized plastic material containing the required or desired additive thoroughly dispersed therein. Polymerization of the partially polymerized plastic material is completed after it is applied as a coating to the pellets. The result is a polymerized plastic pellet having a polymerized plastic coating thereon containing appropriate additives.

It is an important feature of this invention that the coating and the pellet need not necessarily be comprised of the same resin although in most cases they will be. For example, a pellet consisting of a polystyrene plastic may be coated with an acrylic plastic or, conversely, an acrylic pellet may be coated with a polystyrene plastic. As has been indicated, it is equally true that a polystyrene pellet may be coated with polystyrene and an acrylic pellet with acrylic resin. In any case, the preparation of the coating, consisting of a plastic material and an appropriate additive, is a relatively minor procedure in view of the relatively insignificant proportion which these substances bear to the basic pellet material.

It will be apparent from the foregoing that a very advantageous feature of the invention resides in the fact that the coating material may be prepared simultaneously in various batches in readiness for combining with the basic plastic material. As one production run with one of these coating batches is completed, another production run with another coating batch may be commenced, without serious interruption to the normal extruding or molding operations. This is an especially useful feature in connection with short production runs.

The essential steps in the procedure herein claimed are few and simple: The first step is to prepare or provide fully polymerized pellets of a given plastic material, for example styrene. In many cases such pellets may be purchased on the open market in relatively large or small quantities, at relatively low cost, and of relatively high quality and relatively uniform properties. The second step is to prepare or provide a batch of coating material consisting of a partially polymerized plastic material and one or more additions. This step will shortly be described in greater detail. The third step is to apply such coating material to the pellets and to complete polymerization of said coating material thereon. The fourth and final step is to utilize the coated pellets in extruding or molding operations.

The pellets are exposed to high temperatures and pressures in the extruding and injection molding machines and they are melted down to a fluid mass. The coating is also melted down at the same time and by the same means. A screw is generally used to force the plastic material into a mold (in injection molding) or through a die (in extrusion procedures) and the effect of such operation is to intimately and uniformly disperse the coating material throughout the fluid plastic mass, and the result is a substantially homogeneous material consisting of the basic plastic material and the required additives.

The invention is illustrated in the accompanying drawing, in which.

Figure 1:
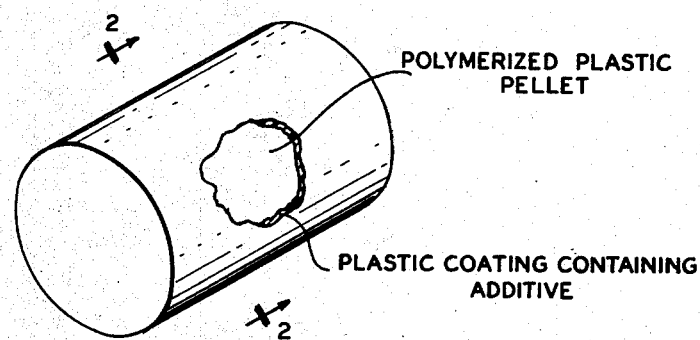
FIGURE 1 is a view of a coated plastic pellet prepared in accordance with the method herein described and claimed, the coating being partly broken away to expose the underlying pellet.
Figure 2:
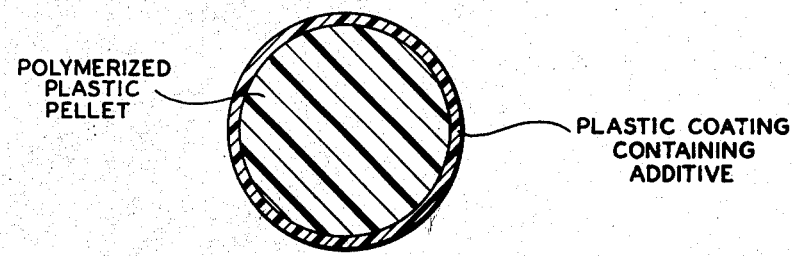
FIGURE 2 is a section through said coated pellet on the line 2—2 of FIGURE 1.

The pellet which the drawing illustrates is conventional in form, being substantially cylindrical, and it is formed by an extrusion process. For purposes of illustration it will be assumed that the pellet is made of a fully polymerized styrene plastic. Let it also be understood for purposes of illustration that the coating consists of a fully polymerized styrene plastic containing one or more additives incorporated therein for any of the purposes and to achieve any of the properties above mentioned. For example, a pigment may be added for coloring purposes and fire retardant for fire-retarding purposes.

The manner in which the pellet coating is formed is as follows: A monomer of the plastic to be used is partially polymerized until it becomes a gel. In the illustrated form of the invention the monomer of a styrene plastic is used. At least one additive, whether in the form of a liquid or powder or in granular or other form, is added to the gelled, partially polymerized plastic and thoroughly dispersed within it to form a substantially homogeneous mass. The mixture of the partially polymerized and gelled plastic and the additive dispersed therein is then applied to the pellets, either by spraying, whirling or tumbling, or by any other suitable method. The coating method is entirely discretionary with the user and all that is required is that the pellets be completely covered or coated with a thin film or coating of the gelled material. Shortly after (or even during) the coating operation, the plastic coating is completely polymerized. The result is a polymerized plastic pellet having a polymerized plastic coating thereon about one mil thick.

The coated pellets are now ready for use. They are placed in an injection molding machine or an extrusion press and are exposed to sufficient heat and pressure to melt them to a fluid consistency. A screw forces the fluid material through the machine and into a mold or through a die, as the case may be, depending upon whether it is an injection molding or an extrusion molding machine. As the material is thus forced through the machine, it is agitated and mixed so that the coating material is intimately dispersed throughout the basic plastic material to form a substantially homogeneous mass. The result is a molded or extruded article, composed of the basic plastic material and having the special properties which the additive or additives embodied therein provide.

The following specific examples will illustrate the range and potentialities of the present invention. It will, of course, be understood that the specific materials given and their proportions are purely illustrative and are not intended to limit the application and scope of the invention.

EXAMPLE 1

*Adding a blowing agent to a thermoplastic material*

The thermoplastic material used in this case was high-impact polystyrene. The blowing agent consisted of sodium bicarbonate and citric acid. 100 pounds of resin in pellet form constituted the basic plastic material. The pellets were of conventional size, up to approximately ⅜ of an inch in length and approximately ⅛ of an inch in diameter. Pellets approximately ¼ of an inch in length and approximately ⅟₁₆ of an inch in diameter were found to be suitable. These pellets were covered with a coating containing the blowing agent in the proportion of approximately 1 percent of blowing agent to the basic plastic material. More specifically, use was made of approximately .7 of a pound of sodium bicarbonate and approximately .5 of a pound of citric acid, making a total of slightly in excess of 1 percent of the resin weight.

In the preparation of the coating, approximately 2.5 pounds of polystyrene crystals were added to approximately 2.5 pounds (99.5%) of styrene monomer. The polystyrene crystals were dissolved in the styrene monomer by stirring until the mix reached a Baumé of 42 degrees and a temperature of 75 degrees Fahrenheit, resulting in partial polymerization. The dry powders (the sodium bicarbonate and citric acid totaling 1.2 pounds) were then added to the partially polymerized mass and mixed in thoroughly to form the coating material. The coating procedure consisted of adding the coating material to the polystyrene pellets and mixing thoroughly. Any suitable mixing or agitating equipment may be used for this purpose but care should be taken to avoid generating sufficient heat to activate the blowing agent. A rotary mixer having radial mixing arms has been found to be suitable. The heat of friction generated in the course of the mixing action completely polymerized the partially polymerized styrene used in the coating. At no time did the temperature exceed 100 degrees Fahrenheit. It is, of course, true that additional heat may be applied to speed up the reaction but, as above indicated, caution should be exercised to avoid activating the blowing agent. In this connection it is important that the exothermic heat developed in the polymerization of coating styrene be dissipated for precisely the same reason above given, namely to avoid activating the blowing agent.

At the conclusion of the mixing operation, the coating resin was completely polymerized and it very adequately protected the blowing agent against such temperature and humidity conditions and variations as would normally be encountered in storage, shipment and handling. Each pellet was found to be completely coated with a thin film of the coating material, the proportion of coating material to pellet material being indicated by the proportion of the materials above given.

EXAMPLE 2

*Adding pigment to thermoplastic material*

The thermoplastic material used in this case was a general-purpose polystyrene, as distinguished from the high-impact polystyrene in Example 1. The pigment was a formaldehyde base, dilute fluorescent type. 100 pounds of the polystyrene pellets were used, together with .5 of a pound of pigment. In preparing the coating material, 2 pounds of polystyrene crystals were added to 2 pounds of the styrene monomer. The crystals were dissolved in the monomer by stirring until the mix reached a Baumé of 42 degrees and a temperature of 75 degrees Fahrenheit, resulting in partial polymerization. The pigment was then added to the partially polymerized mass and mixed in thoroughly, thereby forming the coating material. Said coating material was then added to the polystyrene pellets and thorough mixing followed. The heat of friction was sufficient to completely polymerize the partially polymerized resin in the coating material. The pellets were completely coated with said coating material and they were then ready for use. The conditions and precautions mentioned in connection with Example 1 were pertinent to Example 2, although the problem of premature activation of the blowing agent was not present in Example 2. In other words, the temperatures developed by the reactions in Example 2 were not as critical as in Example 1.

EXAMPLE 3

*Adding methyl methacrylate to a thermoplastic material*

In this case the thermoplastic material used was general-purpose polystyrene and methyl methacrylate was added to it as an alloying agent to increase its weatherability and fabricating characteristics. Once again, 100 pounds of polystyrene pellets were used. 2 pounds of acrylic crystals were added to 2 pounds of methyl methacrylate monomer and thoroughly mixed until partial polymerization set it. This produced the coating material which was then added to and thoroughly mixed with the 100 pounds of polystyrene pellets. The frictional heat generated by the mixing operation was sufficient to completely polymerize the resin in the coating material. The result was a thin acrylic coating completely covering each polymerized pellet.

The foregoing examples illustrate the present invention and it will be understood that other materials, formulations and procedures may be utilized within the broad principles of the invention in order to produce coated plastic materials which may be used in manufacturing thermoplastic articles having special properties.

What is claimed is:

1. A method of producing extrudable polystyrene foam thermoplastics, comprising the steps of providing polystyrene in pellet form, combining polystyrene with a styrene monomer to produce a partially polymerized coating material, combining said coating material with a chemically decomposable blowing agent additive consisting of sodium bicarbonate combined with citric acid, applying said additive-containing coating material to said polystyrene pellets, and then completing polymerization of said partially polymerized coating material.

2. A method in accordance with claim 1, wherein the relative proportions of the several materials in parts by weight are 100 parts polystyrene in pellet form and approximately 6.2 parts of coating material, consisting of approximately 2.5 parts of the styrene polymer, approximately 2.5 parts of the styrene monomer, approximately .7 part of the sodium bicarbonate and approximately .5 part of the citric acid.

References Cited by the Examiner

UNITED STATES PATENTS

| | | | |
|---|---|---|---|
| Re. 23,941 | 2/55 | MacLagan et al. | 117—100 |
| 2,245,040 | 6/41 | Marks | 117—100 |
| 2,376,706 | 5/45 | Lum. | |
| 2,572,068 | 10/51 | Sommer | 259—146 |
| 2,602,784 | 7/52 | Taylor | 117—100 |
| 2,637,535 | 5/53 | Arnold | 259—1 |
| 2,639,238 | 5/53 | Alther et al. | 252—7 |
| 2,787,809 | 4/57 | Stastny | 18—48 |
| 2,835,481 | 5/58 | Cox | 259—1 |
| 2,847,196 | 8/58 | Franklin et al. | 259—8 |
| 2,907,675 | 10/59 | Gaylord. | |
| 2,941,964 | 6/60 | Houstan et al. | 260—2.5 |
| 2,945,828 | 7/60 | Henning | 117—100 |
| 2,987,501 | 6/61 | Rieke et al. | 117—100 |
| 2,989,782 | 6/61 | Barkhuff et al. | 117—100 |

LEON J. BERCOVITZ, *Primary Examiner.*

M. V. BRINDISI, M. D. MARTIN, J. B. SPENCER,
*Examiners.*